(12) United States Patent
Pakele, Jr. et al.

(10) Patent No.: US 9,731,625 B2
(45) Date of Patent: Aug. 15, 2017

(54) ADJUSTABLE CROSSOVER FOR ELECTRIC TROLLEY LINES

(71) Applicants: John K. M. Pakele, Jr., Belfair, MA (US); Brian Grant, Sunnyvale, CA (US)

(72) Inventors: John K. M. Pakele, Jr., Belfair, MA (US); Brian Grant, Sunnyvale, CA (US)

( * ) Notice: Subject to any disclaimer, the term of this patent is extended or adjusted under 35 U.S.C. 154(b) by 486 days.

(21) Appl. No.: 14/526,463

(22) Filed: Oct. 28, 2014

(65) Prior Publication Data

US 2016/0114700 A1    Apr. 28, 2016

(51) Int. Cl.
*B60M 1/00* (2006.01)
*B60M 1/14* (2006.01)

(52) U.S. Cl.
CPC .................................... *B60M 1/14* (2013.01)

(58) Field of Classification Search
CPC ........................................................ B60M 1/14
USPC .......................................................... 191/37
See application file for complete search history.

(56) References Cited

U.S. PATENT DOCUMENTS

| | | | | |
|---|---|---|---|---|
| 616,872 A | * | 1/1899 | Andersen | B60M 1/14 191/37 |
| 1,010,722 A | * | 12/1911 | Clapp | B60M 1/14 191/37 |
| 1,211,010 A | * | 1/1917 | Tighe | B60M 1/14 191/37 |
| 1,608,819 A | * | 11/1926 | Schaake | B60M 1/14 191/37 |
| 1,711,883 A | | 5/1929 | Forsyth | |
| 1,806,164 A | * | 5/1931 | Holden | B60M 1/14 174/147 |
| RE18,977 E | * | 10/1933 | Holden | B60M 1/14 191/37 |
| 2,037,905 A | * | 4/1936 | Holden | B60M 1/14 191/37 |
| 2,216,290 A | | 10/1940 | Broom et al. | |
| 2,225,766 A | | 12/1940 | Broom et al. | |
| 2,525,484 A | * | 10/1950 | Hanna | B60M 1/24 191/37 |
| 2,727,102 A | * | 12/1955 | Sawyer | B60M 1/14 104/35 |
| 2,802,072 A | * | 8/1957 | Matthes | B60M 1/14 191/37 |
| 2,872,522 A | * | 2/1959 | Matthes | B60M 1/14 191/37 |
| 5,341,906 A | * | 8/1994 | White | B60M 1/14 191/37 |

(Continued)

FOREIGN PATENT DOCUMENTS

SU    1159811    6/1985
SU    1477583    5/1989

*Primary Examiner* — Jason C Smith
(74) *Attorney, Agent, or Firm* — Richard C. Litman (57) ABSTRACT

The adjustable crossover includes first and second crossmembers, each having a central disc with two opposed arms extending radially therefrom. Each disc has a series of radial teeth on one side thereof, with the radial teeth of the two discs engaging one another to lock the arms of the two discs at an angle to one another when the two discs are locked together. The distal ends of the arms include electric line connectors to facilitate attachment of electrical power lines or cables.

18 Claims, 4 Drawing Sheets

(56) References Cited

U.S. PATENT DOCUMENTS

2016/0114700 A1* 4/2016 Pakele, Jr. ............... B60M 1/14
                                                                                191/37

* cited by examiner

ADJUSTABLE CROSSOVER FOR ELECTRIC TROLLEY LINES

BACKGROUND OF THE INVENTION

1. Field of the Invention

The present invention relates generally to electrical connectors, and particularly to an angularly adjustable crossover for overhead electric trolley lines.

2. Description of the Related Art

Electrically powered trolley buses or trolleys are commonly provided for public transportation in many cities and other areas of the world. Electric trolleys have a number of advantages, e.g., economical operation, low noise, low pollution, rider convenience, and others. One of the few significant disadvantages of such electric trolleys is the need to provide electrical power from some external source, as the carriage of internal electrical storage batteries is impractical in such an operation.

Accordingly, electrically powered trolleys receive their power either from underground electrical cables or overhead electrical cables, with overhead electrical cables likely being the more common installation due to the relative ease of installation. In either case, some provision must be made for the electrical power cables or lines to cross one another in any but the simplest routing structure.

This is conventionally accomplished by a specially manufactured crossover that connects two lines of one route with two lines of another route, i.e., four electrical lines are connected together to form two continuous lines with the two lines at some angle to one another. Typically, the two continuous lines are at 90 degrees to one another due to the typical square or rectangular city block configuration of most cities, and most such crossovers are manufactured accordingly. However, in many cases the two electric lines cross at some angle other than 90 degrees and a specially manufactured crossover must be provided, with corresponding additional expense for such a specially manufactured unit.

A number of mechanical switches and electrical crossovers have been developed in the past. An example of such is found in Soviet Patent Publication No. 1159811 published on Jun. 7, 1985 to Ni Pi Gorodskogo Passazhirskog. This reference appears to describe (according to the drawings; no English abstract or translation was provided) an adjustable crossover for two or more intersecting lines.

Another example is found in Soviet Patent Publication No. 1477583 published on May 7, 1989 to Ni Pi Gorodskogo Passazhirskog. This reference describes (according to the drawings and machine generated English translation) a multiple line crossover with the various lines being electrically insulated from one another.

Thus, an adjustable crossover for electric trolley lines solving the aforementioned problems is desired.

SUMMARY OF THE INVENTION

The adjustable crossover for electric trolley lines can be angularly adjusted to connect crossing or intersecting overhead electric power lines or cables. The crossing overhead power lines may be at any angle. For example, the angle can be a shallow, acute angle or a 90 degree angle.

The adjustable crossover generally includes two mating cross-members, with each cross-member having a central disc and two opposed arms extending radially therefrom. The two cross-members are assembled as a lower cross-member and an upper cross-member. The central disc of the lower cross-member has a series of radially disposed teeth on the upper surface thereof, with the central disc of the upper cross-member having a series of radially disposed teeth on the lower surface thereof. The radial teeth of the two discs engage one another to lock the two discs angularly relative to one another, thus also locking their arms angularly relative to one another when the two cross-members are secured together. Each disc preferably has a plurality of radial teeth to enable relatively fine adjustment of the angles subtended between the arms of the two cross-members.

Each arm can include an elongate flat plate having a generally V-shaped guide therebeneath. Each of the guides can be compatible in shape to the mating groove or channel of an electrical pickup or "shoe" that extends upwardly from the trolley to receive electrical power from the overhead lines and crossover. The two cross-members of the crossover are secured to one another by mating threaded fasteners, with one fastener comprising a bolt with a specially formed head that extends from the bottom plate at the center of the crossover. The head of the bolt has a cross section essentially identical to the V-shaped sections of the guides in order to reduce the gap across the opposed V-shaped guide sections and facilitate passage of the pickup shoe across the center of the crossover. The mating internally threaded component extending from the top plate has an eye extending therefrom, for supporting the crossover from a suspension cable or line.

The distal end of each crossover arm has a pair of parallel flanges extending upwardly therefrom. These flanges serve for the attachment of electrical line or cable connectors to the crossover. Each cable connector has a lug or flange extending therefrom to bolt between the two flanges at the end of each crossover arm. One embodiment of a cable attachment has a tubular extension with a series of clamping bolts extending therefrom. One end of the electrical cable is inserted in the tubular extension and the clamping bolts are tightened to lock the end of the cable in place. Another embodiment of a cable attachment has an inverted channel in which a hollow conductor tube with a solid core lug is seated. A retaining band is installed about the attachment and conductor tube, with the tube being locked in place by a bolt installed through the attachment to bear against the tube and lock it against the retaining band.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
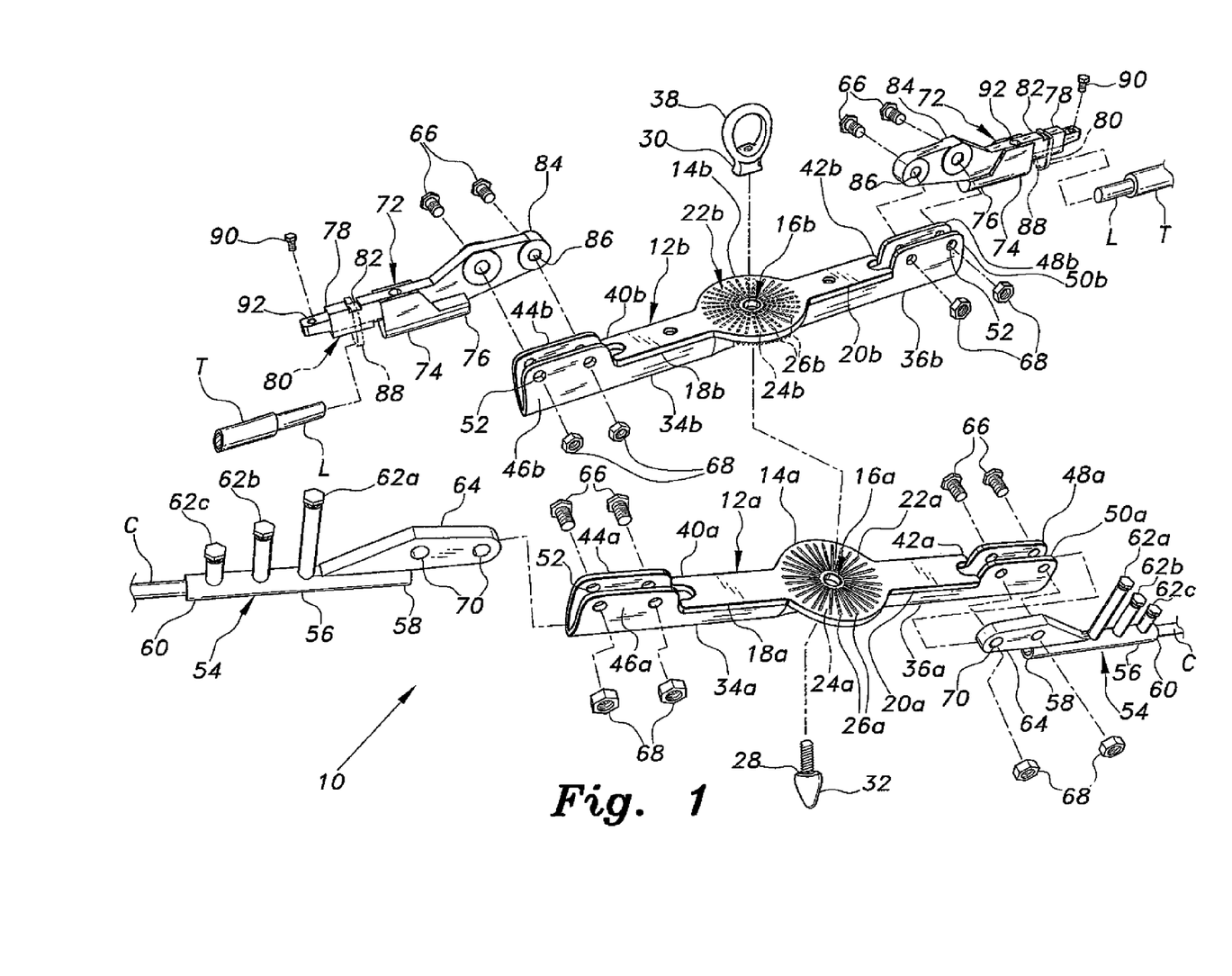
FIG. 1 is an exploded perspective view of an adjustable crossover for electric trolley lines according to the present invention, illustrating various components thereof and their relationships.

FIG. 1 of the drawings provides an exploded perspective view of an adjustable crossover for electric trolley lines 10, illustrating its various components. The adjustable crossover 10 essentially includes a first cross-member 12a and a second cross-member 12b. Each cross-member has a central disc, respectively 14a and 14b, with each disc having a fastener passage, respectively 16a and 16b, concentrically therethrough. Mutually opposed first and second arms, respectively 18a, 20a for the first cross-member 12a and 18b, 20b for the second cross-member 12b, extend from the central discs of each cross-member. The first cross-member 12a and the second cross-member 12b of the adjustable crossover for electric trolley lines are generally similar and may be connected to one another at a variety of angles, e.g., between very shallow or acute angles and 90 degrees, to provide continuous electrical power in overhead electrical trolley lines that intersect at various angles to one another.

Each disc 14a, 14b has a first surface, respectively 22a and 22b, and an opposite second surface, respectively 24a and 24b. The first surface 22a of the first disc 14a of the first cross-member 12a includes a plurality of radially disposed teeth 26a thereon, extending from the central passage 16a toward the outer periphery of the disc. The second surface 24b of the second disc 14b of the second cross-member 12b includes radially disposed teeth 26b thereon, equal in number and configuration to the teeth 26a of the first disc 14a. As shown in the exploded perspective view of FIG. 1, the teeth 26a of the first disc 14a are in full view, while the teeth 26b of the second disc 14b are hidden and shown in broken lines. The two sets of teeth 26a and 26b engage one another when the two cross-members 12a and 12b are assembled with one another. The two discs 14a, 14b preferably have diameters sufficiently large as to provide for a plurality of teeth 26a, 26b, e.g., 180 teeth, thereon. While the discs 14a and 14b can each include 180 teeth, fewer teeth are shown in FIG. 1, for clarity. Providing 180 teeth on each of the discs 14a and 14b can allow the angle between the first and second cross-members 12a, 12b, to be adjusted in two degree increments, which is desirable for practical purposes with respect to overhead electrical lines. However, any other suitable number of teeth may be provided on each disc 14a, 14b as desired, as long as each disc contains an equal number of teeth.

Externally and internally threaded fasteners, respectively 28 and 30, are provided to secure the two cross-members together. The externally threaded fastener 28 is inserted through the passages 16a and 16b of the two discs 14a and 14b from below, with the internally threaded fastener 30 engaging the protruding threaded shank of the externally threaded fastener 28 from above the second disc 14b. The two cross-members are assembled with one another, the angles between the arms thereof are adjusted as required, and the two fasteners 28 and 30 are tightened to lock the mating teeth 26a, 26b together to immovably lock the angles between the arms.

Figure 3:
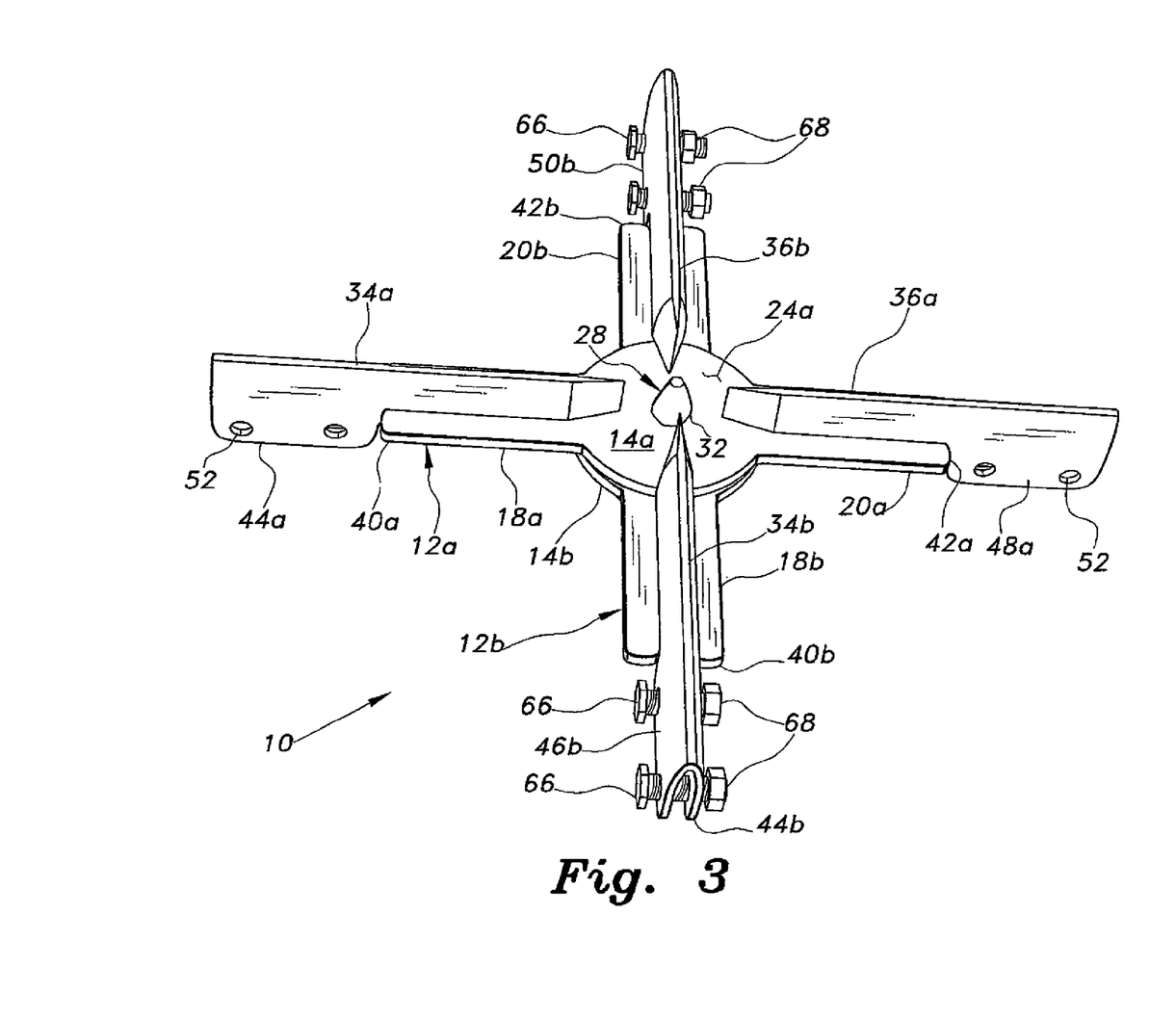
FIG. 3 is a bottom perspective view of the assembled components of the adjustable crossover for electric trolley lines according to the present invention.
Figure 4:
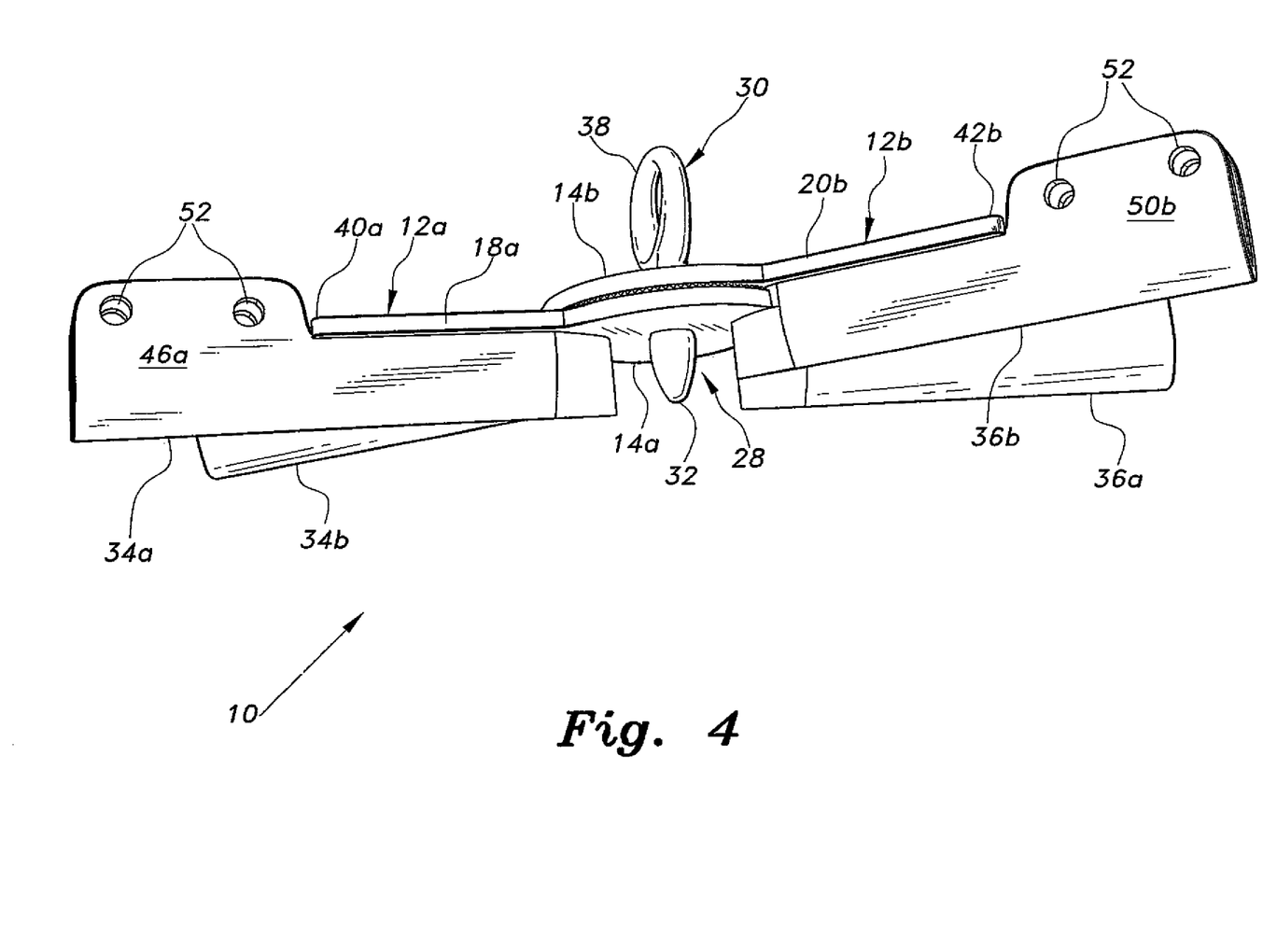
FIG. 4 is a side perspective view of the assembled components of the adjustable crossover for electric trolley lines according to the present invention, illustrating further details thereof.

It will be noted that the head 32 of the externally threaded fastener 28 has a generally conical configuration, best seen in FIGS. 3 and 4. This shape is substantially congruent in cross-section to the generally V-shaped cross-sections of the elongate shoe guides 34a, 36a and 34b, 36b that extend along and beneath the arms 18a through 20b of the two cross-members 12a and 12b. The shoe guides 34a, 36a of the first cross-member 12a and the shoe guides 34b,36b of the second cross-member 12b are relatively narrower than the wider plates or arms 18a, 20 and 18b, 20b of the two cross-members 12a and 12b, respectively. Each plate extends laterally beyond its corresponding shoe guide, as shown particularly in FIG. 3 of the drawings.

In operation, an electrical contact or pickup "shoe" slides along the depending apices of the V-shaped shoe guides 34a, 36a, 34b, and 36b, with the like-shaped depending head 32 of the central externally threaded fastener 28 disposed in the gaps between the shoe guides and axially aligned with the shoe guides, as shown clearly in FIG. 3 of the drawings. This serves to reduce the discontinuity between the shoe guides across the center of the assembled crossover 10, and facilitates the transfer of the pickup shoe across the gap between shoe guides during operation. The internally threaded fastener 30 extends above the central discs 14a, 14b of the two cross-members 12a, 12b, with the fastener 30 having a suspension eye 38 extending therefrom. The suspension eye 38 serves to suspend the crossover assembly 10 from an overhead support wire or line in its installed state.

Each arm 18a, 20a of the first cross-member 12a has a distal end, respectively 40a and 42a. Similarly, each arm 18b, 20b of the second cross-member 12b has distal ends 40b and 42b. Each arm distal end has mutually opposed and substantially parallel first and second connector attachment flanges extending therefrom, i.e., first and second flanges 44a and 46a for the first arm 18a of the first cross-member 12a, first and second flanges 48a, 50a for the second arm 20a of the first cross-member 12a, first and second flanges 44b, 46b for the first arm 18b of the second cross-member 12b, and first and second flanges 48b, 50b for the second arm 20b of the second cross-member 12b. These flanges 44a, 46a, 48a, 50a, 44b, 46b, 48b, and 50b may be formed as extensions of the sides of the respective shoe guides 34a, 36a, 34b, and 36b. The flanges 44a through 50b include conductor attachment passages 52 therethrough.

Different electrical conductor configurations are known in the field of overhead electrical conductors for trolleys and the like. One type includes a solid wire cable having a substantially circular cross section. Another type includes a hollow tube having an oval cross section. Different types or configurations of electrical connectors or attachments can be provided for the attachment of these different conductor configurations. FIG. 1 illustrates a first type of connector 54 suitable for use with a solid conductor cable and a second type of connector 72 suitable for use with a hollow metal tube T. It will be understood that this installation is exemplary, and the different types or configurations of connectors can be selected depending upon the type of electrical conductor used in the system in which the present crossover 10 is installed.

The solid cable type connector 54 includes a hollow tubular body 56 with an arm attachment end 58, a cable attachment end 60 opposite the arm attachment end, and at least one locking bolt fitting and locking bolt extending outwardly from the body 56. In the examples illustrated in FIG. 1, a series of three locking bolt fittings and corresponding locking bolts 62a through 62c are provided for redundancy and greater reliability. The internal ends of the locking bolts 62a through 62c thread at least partially into the hollow body 56 to grip the solid electrical conductor cable C tightly therein. An arm attachment flange 64 extends from the arm attachment end 60 of the connector 54, with the arm attachment flange 64 being sandwiched between corresponding connector attachment flanges, e.g., between flanges 44a and 46a of the first arm 18a, and between flanges 48a and 50a of the second arm 20a of the first cross-member 12a. Bolts 66 and mating nuts 68 may be used to secure the cable connectors 54 to the cross-member 12a through the bolt holes 70 in the arm attachment flange 64 and corresponding conductor attachment passages or bolt holes 52 of the arm flanges 44a through 50b. It will be seen that the flanges of the second cross-member 12b also provide for the attachment of cable type connectors 54 thereto, if desired.

The second type or configuration of electrical conductor connector 72 can be used when the conductor comprises a hollow oval cross-section metal tube T. This type of tubular conductor connector 72 is shown with the second cross-member 12b in FIG. 1. The tubular conductor connector 72 has a solid body 74 with an arm attachment end 76 and an opposite conductor tube attachment end 78. A conductor tube attachment channel 80 extends along the conductor tube attachment end 78, with a conductor lug strap slot 82 disposed across the conductor tube attachment end 78. As in the case of the solid cable type connector 54, an arm attachment flange 84 extends from the arm attachment end 76 of the connector 72. The arm attachment flange 84 may include bosses about its attachment holes 86 as shown in FIG. 1 for additional strength, if so desired.

The hollow tubular conductor T has an oval cross-section, with a solid lug L having a like cross-section inserted into the open end thereof to prevent the collapse of the tubular conductor T when it is secured in the tubular conductor connector 72. A conductor lug retaining strap or band 88 (shown in broken lines) is placed in the conductor lug strap slot 82, with the strap or band 88 extending beneath the conductor tube attachment channel 80. The lug L is then passed into the conductor tube attachment channel 80 and through the strap or band 88. A lock bolt 90 is then threaded into a hole 92 in the conductor tube attachment end 78 of the connector 72, and tightened to bear against the tubular connector T with its internal lug L. This forces the conductor T and its lug L tightly against the surrounding retaining strap or band 88, thereby preventing separation of the tubular conductor T from the connector 72.

Figure 2:
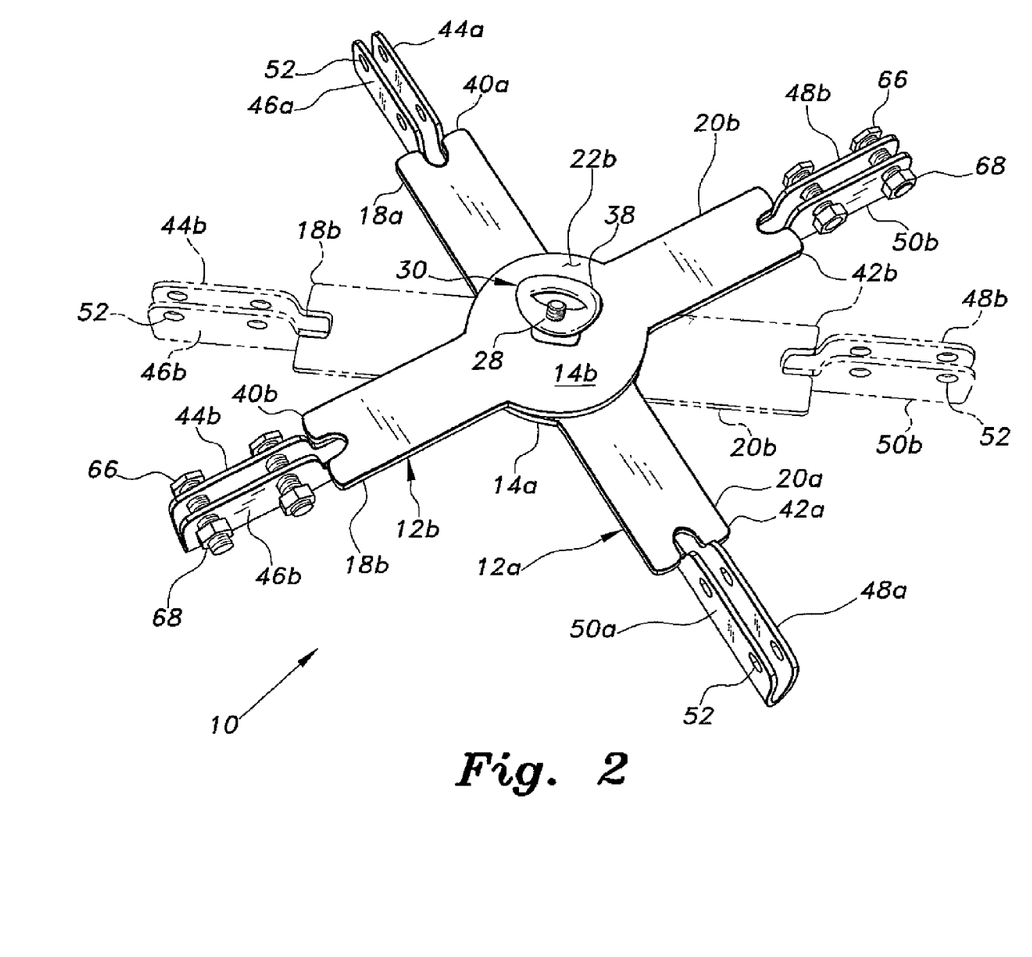
FIG. 2 is a top perspective view of the assembled components of the adjustable crossover for electric trolley lines according to the present invention, with an alternative assembly configuration illustrated in broken lines.

The adjustable assembly of the two major cross-members 12a and 12b is shown more clearly in FIG. 2. An assembly defining angles of substantially 90 degrees between the various arms is shown in solid lines. However, by loosening the two fasteners 28 (shown in FIGS. 1, 3, and 4) and 30, angularly repositioning the two arms 12a and 12b relative to one another, and retightening the fasteners 28 and 38, the angles between the various arms may be adjusted to any practicable angle. For example, a very small angular interval or resolution (depending upon the number of teeth 16a and 16b provided on the two discs 14a and 14b) may be achieved as may be required. An exemplary alternative position is shown for the second cross-member 12b in broken lines in FIG. 2.

FIG. 3 is an illustration of the bottom or underside of the crossover 10 assembly, clearly showing the generally V-shaped sections of the various shoe guides 34a through 36b and the conical shape of the head 32 of the fastener 28. This arrangement provides additional guidance for the pickup shoe as it traverses the gap between shoe guides, e.g., guides 34a and 36a along the first cross-member 12a, thereby improving electrical contact and tracking of the shoe as noted further above.

FIG. 4 provides another perspective view of the crossover 10, showing the meshing of the teeth between the two discs 14a and 14b of the corresponding cross-members 12a and 12b. Again, the relative angle between the two cross-members 12a and 12b may be locked in place as desired and immovably secured at that angle, by the meshing of the teeth when the two fasteners 28 and 30 are tightened through the two discs 14a and 14b. Accordingly, the adjustable crossover 10 obviates the need for manufacture of specialized crossovers for overhead electrical line crossing angles other than 90 degrees, with the assembly of only two major components (cross-members) providing alignment with the overhead lines as required.

It is to be understood that the present invention is not limited to the embodiments described above, but encompasses any and all embodiments within the scope of the following claims.

We claim:

1. An adjustable crossover for electric trolley lines, comprising:
   a first cross-member having a central disc and first and second mutually opposed elongate arms extending from the central disc, each of the arms of the first cross-member has an elongate shoe guide disposed therealong, each shoe guide having a substantially V-shaped cross-section, the central disc having a fastener passage defined centrally therethrough and opposing first and second surfaces, the first surface of the disc having a plurality of radially disposed teeth thereon;
   a second cross-member having a central disc and first and second mutually opposed elongate arms extending from the central disc, each of the arms of the second cross-member has an elongate shoe guide disposed therealong, each shoe guide having a substantially V-shaped cross-section, the central disc having a fastener passage defined centrally therethrough and opposing first and second surfaces, the second surface of the disc having a plurality of radially disposed teeth thereon, the teeth of the second surface of the disc of the second cross-member engaging the teeth of the first surface of the disc of the first cross-member when the first and second cross-members are secured together;
   an externally threaded fastener disposed through the fastener passages of the first and second cross-members, the externally threaded fastener has a head, the head having a substantially conical cross-section substantially congruent with the cross-section of each shoe guide of each of the arms, the head being substantially axially aligned with the shoe guide of each of the arms when the two cross-members are locked together; and
   an internally threaded fastener secured to the externally threaded fastener, the internally and externally threaded fasteners locking the first and second cross-members.

2. The adjustable crossover for electric trolley lines according to claim 1, further comprising:
   first and second connector attachment flanges extending from a distal end of each of the arms of the first and second cross-member, the first and second connector attachment flanges of each arm being mutually opposed and mutually parallel; and
   an electrical connector connected to the connector attachment flanges.

3. The adjustable crossover for electric trolley lines according to claim 1, wherein:
   each of the arms of each cross-member has an elongate shoe guide disposed therealong; and
   each of the arms of each cross-member has a width extending laterally beyond the shoe guide.

4. The adjustable crossover for electric trolley lines according to claim 1, wherein the internally threaded fastener has a suspension eye extending therefrom.

5. The adjustable crossover for electric trolley lines according to claim 1, further comprising an electrical connector connected to a distal end of at least one of the arms, the electrical connector having a hollow tubular body, the hollow tubular body having an arm attachment end, a cable attachment end opposite the arm attachment end, and at least one locking bolt extending at least partially through the tubular body, the arm attachment end having an arm attachment flange connected to the distal end of a respective one of the arms.

6. The adjustable crossover for electric trolley lines according to claim 1, further comprising an electrical connector connected to a distal end of at least one of the arms, the electrical connector having a solid body with an arm attachment end, a conductor tube attachment end opposite the arm attachment end, a conductor tube attachment channel extending along the conductor tube attachment end, and a conductor lug strap slot disposed across the conductor tube attachment end, the arm attachment end having an arm attachment flange connected to the distal end of a respective one of the arms.

7. An adjustable crossover for electric trolley lines, comprising:
a first cross-member having a central disc, a fastener passage defined centrally through the central disc, and first and second mutually opposed elongate arms extending from the central disc, the central disc having mutually opposed first and second surfaces, and each of the arms having a distal end, each distal end having mutually opposed and substantially parallel first and second conductor attachment flanges extending therefrom;
a first electrical connector secured to the first and second conductor attachment flanges of the first cross-member;
a second cross-member having a central disc, a fastener passage defined through the central disc, and first and second mutually opposed elongate arms extending from the central disc, the central disc having mutually opposed first and second surfaces, and each of the arms having a distal end, each distal end having mutually opposed and substantially parallel first and second conductor attachment flanges extending therefrom, the second surface of the disc of the second cross-member engaging the first surface of the disc of the first cross-member when the first and second cross-members are secured together;
a second electrical connector secured to the first and second conductor attachment flanges of the second cross-member;
an externally threaded fastener disposed through the fastener passages of the discs of the first and second cross-members; and
an internally threaded fastener secured to the externally threaded fastener, the internally and externally threaded fasteners locking the first and second cross-members together, wherein the internally threaded fastener includes a suspension eye extending therefrom.

8. The adjustable crossover for electric trolley lines according to claim 7, wherein:
the first surface of the disc of the first cross-member has a plurality of radially disposed teeth thereon; and
the second surface of the disc of the second cross-member has a plurality of radially disposed teeth thereon, the teeth of the second surface of the disc of the second cross-member engaging the teeth of the first surface of the disc of the first cross-member when the first and second cross-members are secured together.

9. The adjustable crossover for electric trolley lines according to claim 7, wherein:

each of the arms of each cross-member has an elongate shoe guide disposed therealong, each shoe guide having a substantially V-shaped cross-section; and
the externally threaded fastener has a head, the head having a substantially conical cross-section substantially congruent with the cross-section of each shoe guide of each of the arms, the head being substantially axially aligned with the shoe guide of each of the arms when the two cross-members are locked together.

10. The adjustable crossover for electric trolley lines according to claim 7, wherein:
each of the arms of each cross-member has an elongate shoe guide disposed therealong; and
each of the arms of each cross-member has a width, the width extending laterally beyond the shoe guide.

11. The adjustable crossover for electric trolley lines according to claim 7, wherein at least one of the first electrical connector and the second electrical connector has a hollow tubular body, the hollow tubular body having an arm attachment end, a cable attachment end opposite the arm attachment end, and at least one locking bolt extending at least partially through the tubular body, the arm attachment end further having an arm attachment flange connected to the distal end of a respective one of the arms.

12. The adjustable crossover for electric trolley lines according to claim 7, wherein at least one of the electrical connector and the second electrical connector has a solid body, the solid body having an arm attachment end, a conductor tube attachment end opposite the arm attachment end, a conductor tube attachment channel extending along the conductor tube attachment end and a conductor lug strap slot disposed across the conductor tube attachment end, the arm attachment end having an arm attachment flange connected to the distal end of a respective one of the arms.

13. An adjustable crossover for electric trolley lines, comprising:
a first cross-member having a central disc, a fastener passage defined centrally through the central disc, and first and second mutually opposed elongate arms extending from the central disc, the central disc having mutually opposed first and second surfaces, and each of the arms having an elongate shoe guide disposed therealong and a distal end, each shoe guide having a substantially V-shaped cross-section;
a second cross-member having a central disc, a fastener passage defined through the central disc, and first and second mutually opposed elongate arms extending from the central disc, the central disc having mutually opposed first and second surfaces, and each of the arms having an elongate shoe guide disposed therealong and a distal end, each shoe guide having a substantially V-shaped cross-section, the second surface of the disc of the second cross-member engaging the first surface of the disc of the first cross-member when the first and second cross-members are secured together;
an externally threaded fastener disposed through the fastener passages of the first and second cross-members, the externally threaded fastener having a head, the head having a substantially conical cross-section substantially congruent with the cross-section of each shoe guide of each of the arms, the head being substantially axially aligned with the shoe guide of each of the arms when the two cross-members are locked together; and
an internally threaded fastener secured to the externally threaded fastener, the internally threaded fastener having a suspension eye extending therefrom, the internally and externally threaded fasteners locking the two cross-members together.

14. The adjustable crossover for electric trolley lines according to claim 13, wherein:
the first surface of the disc of the first cross-member has a plurality of radially disposed teeth thereon; and
the second surface of the disc of the second cross-member has a plurality of radially disposed teeth thereon, the teeth of the second surface of the disc of the second cross-member engaging the teeth of the first surface of the disc of the first cross-member when the first and second cross-members are secured together.

15. The adjustable crossover for electric trolley lines according to claim 13, wherein:
the distal end of each of the arms of each cross-member has mutually opposed and substantially parallel first and second conductor attachment flanges extending therefrom; and
an electrical connector is attached to the distal end of each of the arms.

16. The adjustable crossover for electric trolley lines according to claim 13, wherein each of the arms of each cross-member has a width extending laterally beyond the shoe guide.

17. The adjustable crossover for electric trolley lines according to claim 13, further comprising an electrical connector attached to a distal end of at least one of the arms, the electrical connector having a hollow tubular body, the hollow tubular body having an arm attachment end, a cable attachment end opposite the arm attachment end, and at least one locking bolt extending at least partially through the tubular body, the arm attachment end having an arm attachment flange connected to the distal end of a respective one of the arms.

18. The adjustable crossover for electric trolley lines according to claim 13, further comprising an electrical connector connected to a distal end of at least one of the arms, the electrical connector having a solid body with an arm attachment end, a conductor tube attachment end opposite the arm attachment end, a conductor tube attachment channel extending along the conductor tube attachment end and a conductor lug strap slot disposed across the conductor tube attachment end, the arm attachment end having an arm attachment flange connected to the distal end of a respective one of the arms.

* * * * *